United States Patent [19]
Miller

[11] Patent Number: 5,628,462
[45] Date of Patent: May 13, 1997

[54] DRIP IRRIGATION EMITTER

[76] Inventor: David B. Miller, 6477 N. Maroa, Fresno, Calif. 93704

[21] Appl. No.: 515,125

[22] Filed: Aug. 15, 1995

[51] Int. Cl.$^6$ ................................................ B05B 15/00
[52] U.S. Cl. ........................................................ 239/542
[58] Field of Search ............................. 239/542; 138/43, 138/45, 46

[56] References Cited

U.S. PATENT DOCUMENTS

| | | |
|---|---|---|
| Re. 29,022 | 11/1976 | Spencer . |
| 4,209,133 | 6/1980 | Mehoudar . |
| 4,210,287 | 7/1980 | Mehoudar ........................... 239/542 |
| 4,384,680 | 5/1983 | Mehoudar . |
| 4,502,631 | 3/1985 | Christen ............................. 239/106 |
| 4,687,143 | 8/1987 | Gorney et al. . |
| 4,824,025 | 4/1989 | Miller . |
| 5,052,625 | 10/1991 | Ruskin ............................... 239/542 |

FOREIGN PATENT DOCUMENTS

| | | | |
|---|---|---|---|
| 651356 | 1/1992 | Australia .............................. | 239/542 |
| 5257 | 7/1967 | Ireland . | |

OTHER PUBLICATIONS

Rain Bird Sprinkler Mfg. Corp., assignee of patent No.4, 502,631, printed publication of the Rain Bug EM-M emitters.

*Primary Examiner*—Andres Kashnikow
*Assistant Examiner*—Robin O. Evans
*Attorney, Agent, or Firm*—Mark D. Miller

[57] ABSTRACT

A small drip irrigation emitter that is capable of providing a constant flow rate over a wide range of high fluid line pressures. The emitter includes a small relatively soft flat flexible membrane, one side of which is in contact with the fluid of a drip irrigation line, and the other side of which is pressed against a flat surface having a perpendicular opening in it. A groove is provided on the surface leading from its edge to the opening, and a small open rounded preferably slotted area is provided in the opening where it meets the groove. As pressure is provided in the conduit line, the membrane is pressed against the opening and groove, limiting the amount of fluid that may escape across the groove and through the opening. As pressure increases, the opening is closed by the membrane; however, even after the opening is closed, the slot between the opening and the groove allows fluid to continue to escape, thereby requiring an extremely high pressure to close both the opening and the slot to shut off the flow of fluid.

17 Claims, 7 Drawing Sheets

DRIP IRRIGATION EMITTER

BACKGROUND OF THE INVENTION

1. Field of the Invention

The present invention relates to drip irrigation, and in particular to a pressure controlled drip irrigation emitter and apparatus capable of maintaining a constant drip rate over a very wide range of pressure.

2. Description of the Prior Art

Several different varieties of drip irrigation emitters are known in the art. All drip irrigation emitters are associated in some way with a conduit line through which a pressurized fluid may flow. The fluid can be anything, but is typically water for growing plants, either by itself or with dissolved additives such as fertilizers or nutrients. Drip irrigation emitters may be attached to the end of a conduit line, attached along the outside of a conduit line, or inserted into the inside of a conduit line where there is a tiny hole that allows fluid to reach the outside. In every drip irrigation emitter, there is some means for allowing fluid inside the line to reach the outside at a very slow rate.

One of the most common and useful applications of drip irrigation is in hilly, uneven terrain. This is because normal flood or spray irrigation methods either do not work or are very wasteful of scarce water. It also is very common in the drip irrigation industry for drip irrigation conduit lines to be several hundred feet long or longer, attached to a single water source.

These common applications of drip irrigation pose several problems, the most serious relating to pressure. At low pressure, fluid simply flushes through some drip irrigation emitters. Emitters, such as those disclosed in U.S. Pat. Nos. 4,113,180 and 3,779,468 require the pressure inside the conduit line to reach a certain high level before the emitters on the line stop flushing and begin to "drip". The different gradients in hilly terrain generally cause a drip irrigation line to have different pressure levels at different places. A drip irrigation line that is several hundred feet long, even if on level ground, requires significant pressure to activate all of the drip irrigation emitters along its length. This problem is compounded in hilly, uneven terrain.

In order to respond to these problems, different types of drip irrigation emitters have been developed. These include devices such as those disclosed in U.S. Pat. Nos. 4,307,841 and 4,687,143. In each of these devices, a flat flexible membrane is provided on a platform. One side of the membrane is in contact with the fluid in the line, the other side is pressed against a flat surface with an opening to the outside. An elongated shallow groove is provided in the flat surface under the membrane leading from the opening to the edge of the surface. The fluid in the line presses the membrane against the surface and the opening so that at very low pressure only a tiny amount of fluid is allowed to escape through the opening. As pressure is increased, the opening is closed off and only by means of the groove is the fluid allowed to escape. However, when the pressure gets very high, the membrane tends to completely close off the opening and the groove preventing any fluid from escaping through the opening.

Very high pressure is usually required at the beginning of a conduit line in order to assure that at least some pressure reaches all of the line. The longer the line, the greater the initial pressure required. Further, in uneven terrain, lower locations on the line will naturally have higher pressure than higher locations.

Because of the way currently developed emitters are designed, they are not useful in lines where high pressure will be used (e.g. near the beginning of the line, or at a low spot) because at such pressures they tend to reduce the flow rate or close off completely. It is therefore desirable to have a drip irrigation emitter that not only operates at relatively low pressures, but which has a constant flow rate through a wide range of pressures, including very high pressures, without the flow rate dropping or the emitter shutting off completely.

Because of the high cost of materials, it is also desirable to be able to construct smaller drip irrigation emitter units that provide the same flow rates as larger units. Smaller units may be priced lower than larger units, and have the advantage that they can be used on small or large diameter lines. This becomes especially important where thousands of emitters are connected to miles of conduit line.

When pressure to a drip irrigation line is removed, a siphon or back flow can occur resulting in the drawing of dirt and debris into the drip irrigation emitters along the line. In order to avoid the clogging caused by this situation, it is also desirable to provide a way for such drip irrigation emitters to flush out such dirt and debris.

SUMMARY OF THE INVENTION

The present invention postpones the shut off problems associated with high pressure in drip irrigation lines by providing a small drip irrigation emitter that is capable of providing a constant flow rate over a wide range of low and high fluid line pressures. The present invention provides a small drip irrigation emitter that can be used with a small or large diameter line. The emitter may be placed inside or attached to the outside of the line.

The emitter has a small relatively soft flat flexible membrane inside, suspended around its perimeter on a platform having a central cavity therein. The membrane covers the cavity and is able to be bent into it. One side of the membrane is in contact with the main fluid flow and pressure of the drip irrigation line, and the other side is exposed to lower-pressure fluid which has traveled through a series of labyrinths and turbulent flow passages. At rest, the membrane is suspended on a perimeter platform above the cavity which has a flat surface at the bottom. The bottom surface has an exit hole at or near the center, and an annular opening around its edges. The annular opening leads back to the fluid in the line through a series of pressure-reducing labyrinths and turbulent flow paths located in the body of the emitter.

A groove is provided on the bottom surface leading radially outward from the central exit hole to the annular opening at the edge of the bottom surface. A small open slot having a slightly rounded corner is provided in the hole where it meets the groove. The slot is generally parallel to the exit hole and perpendicular to the groove. The slot gives the hole the appearance of a keyhole when viewed from directly above. The opposite end of the groove at the edge of the surface communicates with the reduced-pressure fluid from the annular opening.

As pressure is provided in the conduit line, the suspended membrane is first pressed into the cavity against the bottom surface having the exit hole, groove and slot in it. This limits the amount of fluid that may escape, originating from the annular opening, traveling across the groove in the surface and out through the exit hole. As pressure increases, most of the exit hole (except for the slot) is closed by the membrane; however, even after much of the exit hole is closed, the groove and keyhole slot allow a small, steady trickle of fluid to continue to escape. It requires an extremely high pressure in the fluid in the line to close both the hole and the slot of the present invention.

The height of the cavity between the bottom surface and the perimeter support for the membrane is large enough to allow the initial flow of fluid into the emitter to wash out any dirt or debris before the membrane begins to bend downward and close off the exit hole. A relatively soft membrane is required in a small emitter in order to bend down into such a deep cavity. In larger emitters, the height of the cavity relative to the larger surface of the membrane is less significant, allowing a harder membrane to be effectively used in larger emitters.

It is therefore a primary object of the present invention to provide a drip irrigation emitter that provides a drip at a constant rate over a wider range of high fluid pressures than is presently possible.

It is a further important object of the present invention to provide a drip irrigation emitter that drips at a constant rate from a relatively low to very high fluid pressure.

It is a further important object of the present invention to provide a drip irrigation emitter that drips at a constant rate from a relatively low to very high fluid pressure, the inside of which includes a flat surface with an opening in it, a groove leading from the opening to the edge of the surface, and a slot cut in the opening where it meets the groove.

It is a further object of the present invention to provide a small drip irrigation emitter the inside of which includes a relatively soft membrane having a small surface area provided over a relatively tall cavity having a flat bottom surface with an opening to the outside, where the opening is connected to a groove, and a slot is provided in the opening where it meets the groove in order to allow early flushing of debris and then provide a constant drip rate through a wide range of fluid pressures, including very high pressure, without shutting off.

It is a further important object of the present invention to provide a drip irrigation emitter that can be used to provide a constant drip flow rate in drip irrigation systems that have different fluid pressures at different locations within the same system.

Additional objects of the invention will be apparent from the detailed descriptions and the claims herein.

DETAILED DESCRIPTION OF THE DRAWINGS

Figure 1:
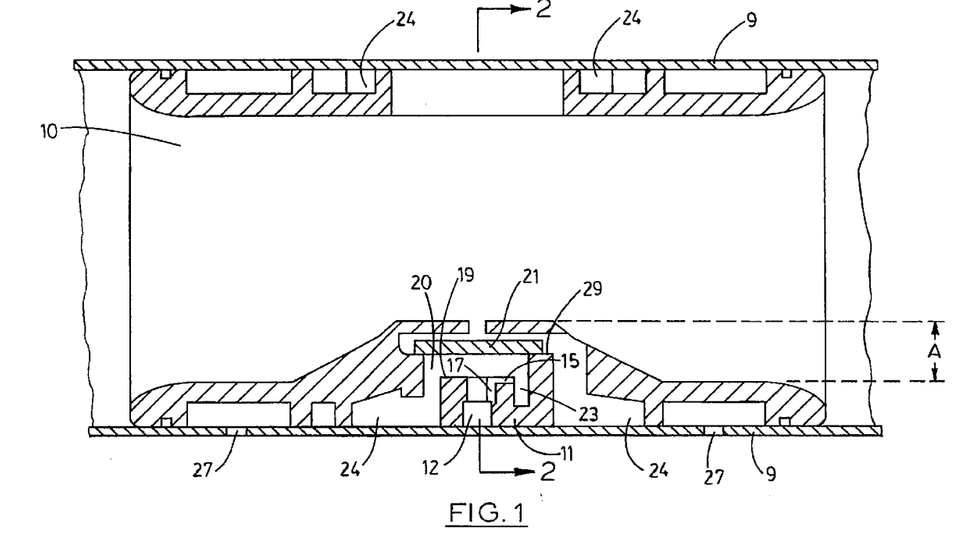
FIG. 1 is an enlarged cross sectional side view of the preferred embodiment of the present invention showing detail of the area around the exit opening.
Figure 2:
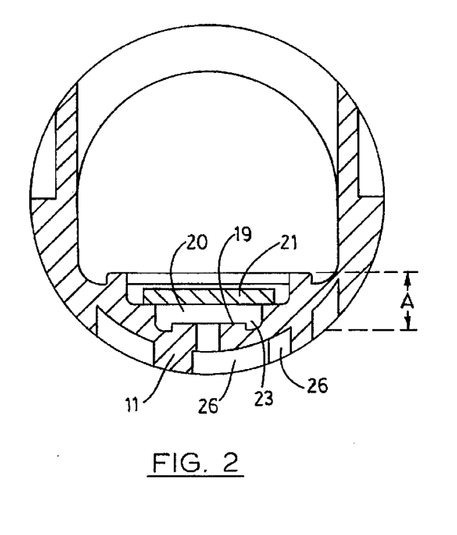
FIG. 2 is a cross sectional end view along line 2—2 of FIG. 1.

Referring to the drawings wherein like reference characters designate like or corresponding parts throughout the several views, and referring particularly to FIGS. 1, and 2 it is seen that the invention includes a drip irrigation emitter, generally 10, inserted into a conduit line 9. The emitter includes a housing 11 with a central exit hole 12 therein. Hole 12 allows for fluid to pass from the inside of emitter 10 through a series of channels 26 to holes 27 in the conduit line 9 leading to the exterior (see FIG. 2). It is seen in FIG. 2 at dimension "A" that housing 11 has a low internal profile of less than three and one-half millimeters (3.5 mm) greater than the thickness of tube 10. This allows for less friction with the fluid in the line 9 resulting in less pressure loss from the presence of the emitters 10 in the line.

A central internal cavity 20 is provided above exit hole 12. At the bottom of cavity 20 is a flat surface 19 which surrounds hole 12. An opening 23 is provided around the perimeter of surface 19. Opening 23 leads back to the inside of the emitter through a series of labyrinths and turbulent flow paths 24 in emitter housing 11. These labyrinths and turbulent flow paths 24 lead back and forth across and around emitter 10 to reduce the pressure of fluid flowing therethrough, as is well known in the art.

Figures 3, 4, 5:
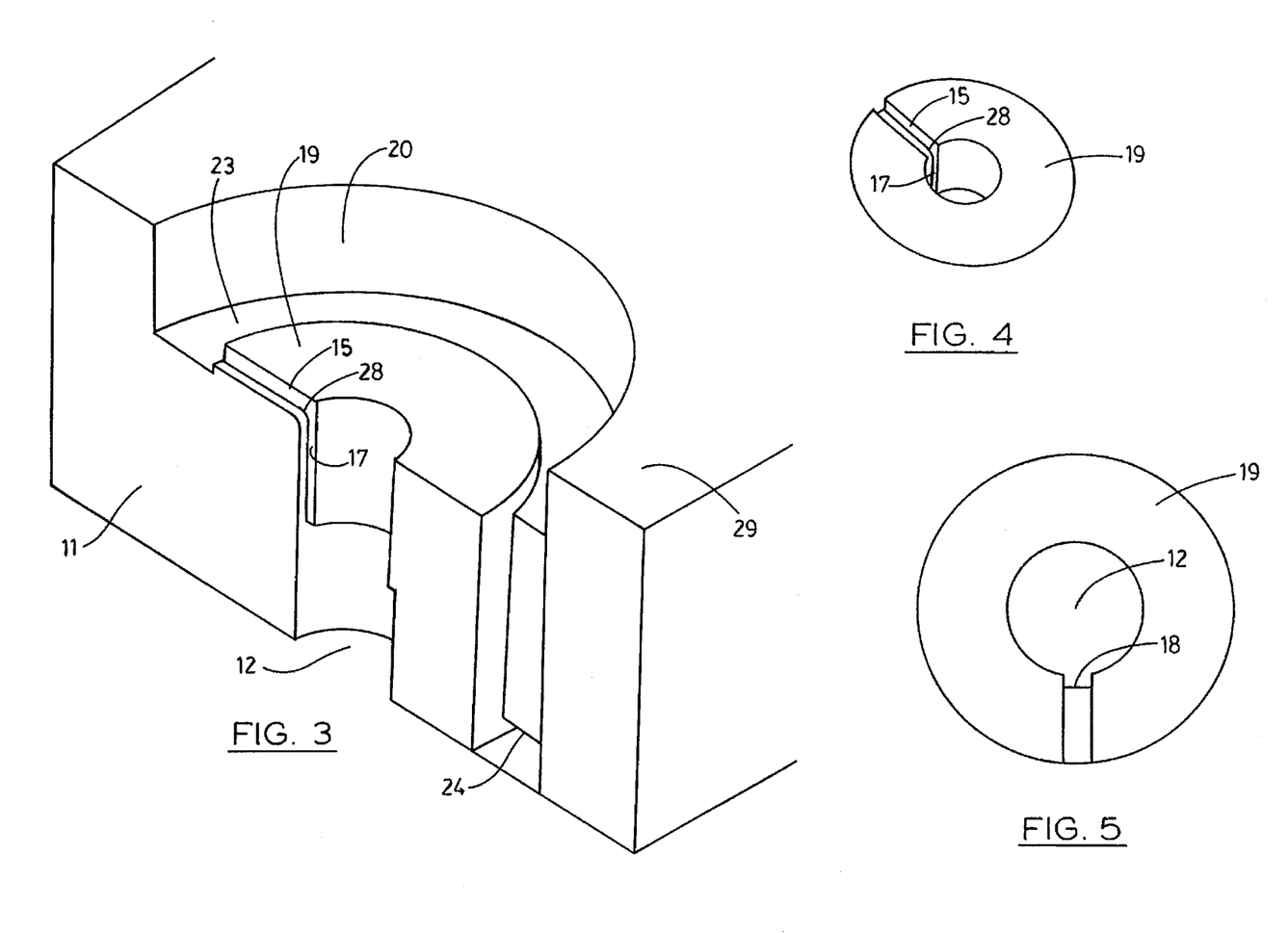
FIG. 3 is a greatly enlarged perspective cut-away detail view of the interior of the drip irrigation emitter of the present invention showing the internal cavity without the membrane in the vicinity of the exit opening.
FIG. 4 is a slightly enlarged fragmentary perspective view of the interior of the drip irrigation emitter of the present invention in the vicinity of the exit opening.
FIG. 5 is a top plan view of the exit opening in the bottom surface of the internal cavity of the drip irrigation emitter of the present invention showing its keyhole appearance.

A shallow horizontal groove 15 is provided in surface 19 extending radially outward from exit hole 12 to perimeter opening 23 at the edge of surface 19. A slot 17 may be provided in exit hole 12 where it meets groove 15. Slot 17 is generally perpendicular to surface 19 and parallel to opening 12 and provides a gap 18 between the end of groove 15 and the edge of opening 12. The gap 18 of slot 17 increases the surface area of opening 12 as shown in the top view of FIG. 5. The inside corner 28 of slot 17 may be slightly rounded.

Figure 6:
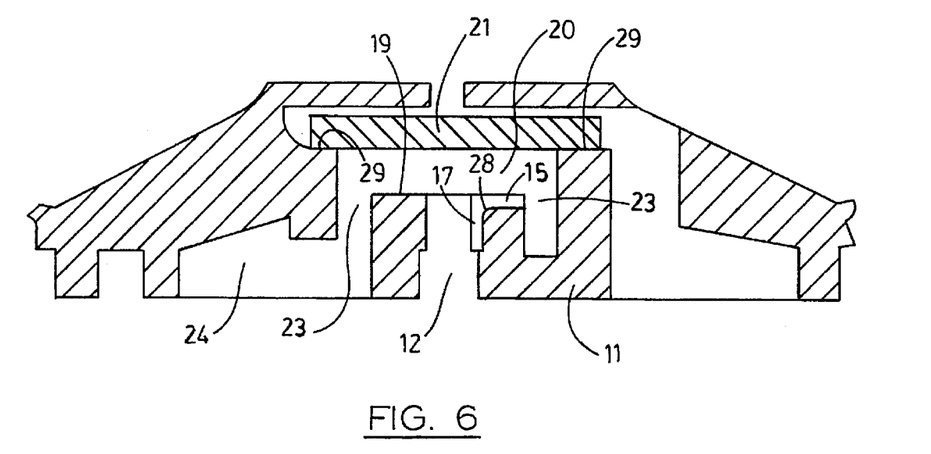
FIG. 6 is an enlarged cross-sectional side view of the exit cavity of FIG. 1 showing the flexible membrane of the present invention suspended above the opening without any pressure applied to it.
Figure 7:
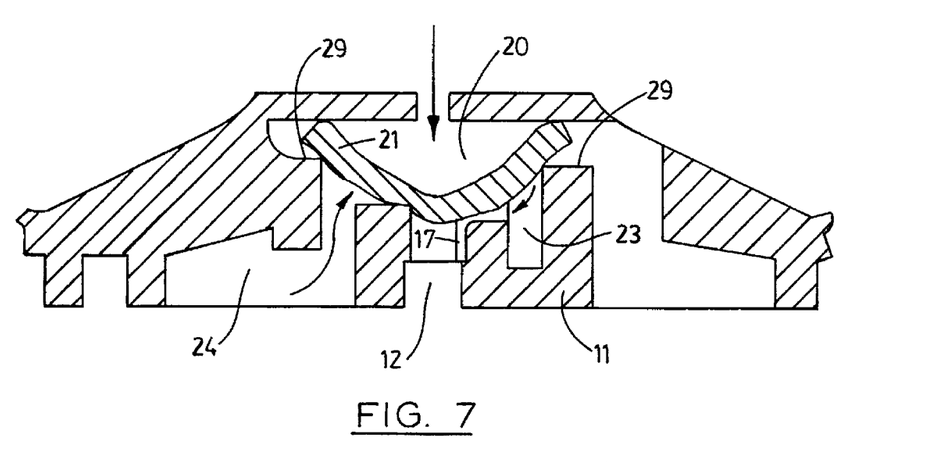
FIG. 7 is the enlarged cross-sectional side view of FIG. 6 showing the flexible membrane of the present invention bending as pressure is applied to it.
Figure 8:
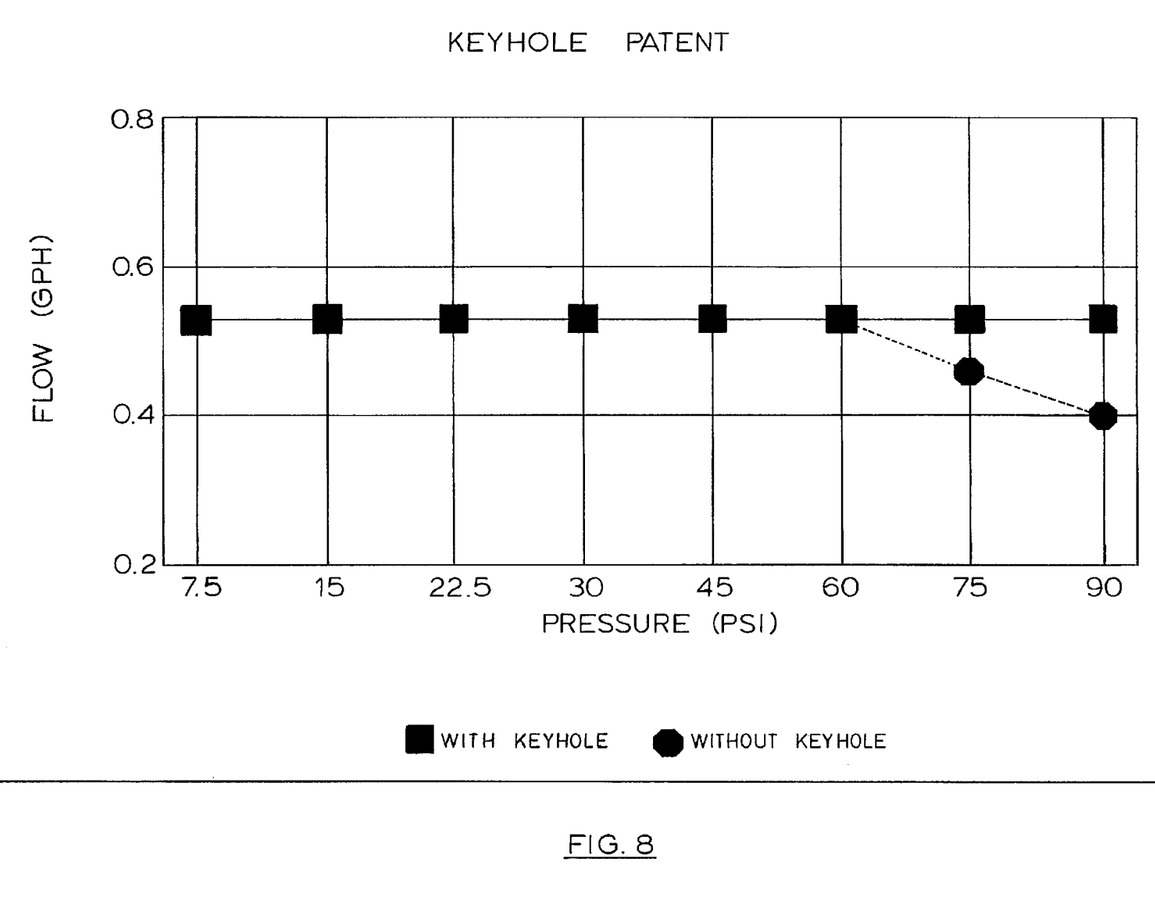
FIG. 8 is a comparison chart showing the difference in the flow rate of the present invention with and without the keyhole groove and slot. The comparisons are in gallons per hour at different pressures in pounds per square inch.

A flexible membrane 21 is provided above cavity 20 and is suspended around its perimeter on a platform 29 as shown in FIGS. 1, 2 and 6. The membrane 21 covers the opening and is able to be bent into it. The distance between surface 19 and platform 29 defines cavity 20 and provides a gap below membrane 21 that is large enough to allow dirt and other potentially clogging debris particles to flush out through exit hole 12 at very low fluid pressure, such as when fluid is first introduced into or shut off from the emitter. As fluid pressure is increased on the inside of emitter 10, membrane 21 is bent downward into cavity 20 as shown in FIG. 7 partially closing off exit 12 except for groove 15 and the gap 18 formed by slot 17. This causes the emitter 11 to drip at a constant but very small trickle of fluid is allowed to escape across groove 15 and slot 17 through exit hole 12.

As fluid pressure increases above membrane 21, it will be pressed into and begin to fill and close off exit hole 12 moving from the inside of hole 12 outward. In existing emitters which do not have the gap 18 formed by slot 17 of the present invention, a fluid pressure above sixty (60) pounds per square inch (psi) is usually enough to close off the exit hole (12), reducing and eventually stopping the flow from such an emitter. However, the gap formed by vertical slot 17 of the present invention prevents membrane 21 from closing off opening 12 groove 15 and perpendicular slot 17 until a very high pressure of at least ninety (90) psi is reached. This occurs because membrane 21 must be pressed firmly into all three areas to shut off the emitter: opening 12, groove 15 and the gap 18 of slot 17.

Figure 9:
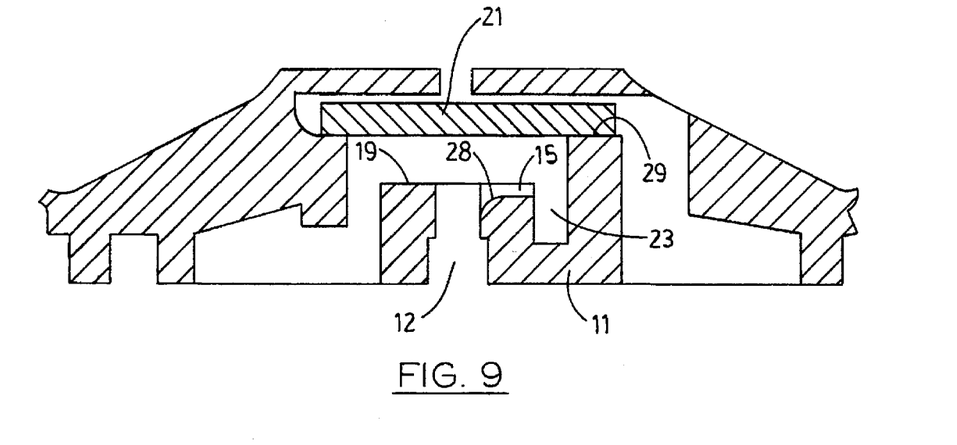
FIG. 9 is an enlarged cross-sectional side view of the exit cavity of an alternative embodiment of FIG. 1 showing the flexible membrane of the present invention suspended above the opening without any pressure applied to it.
Figure 10:
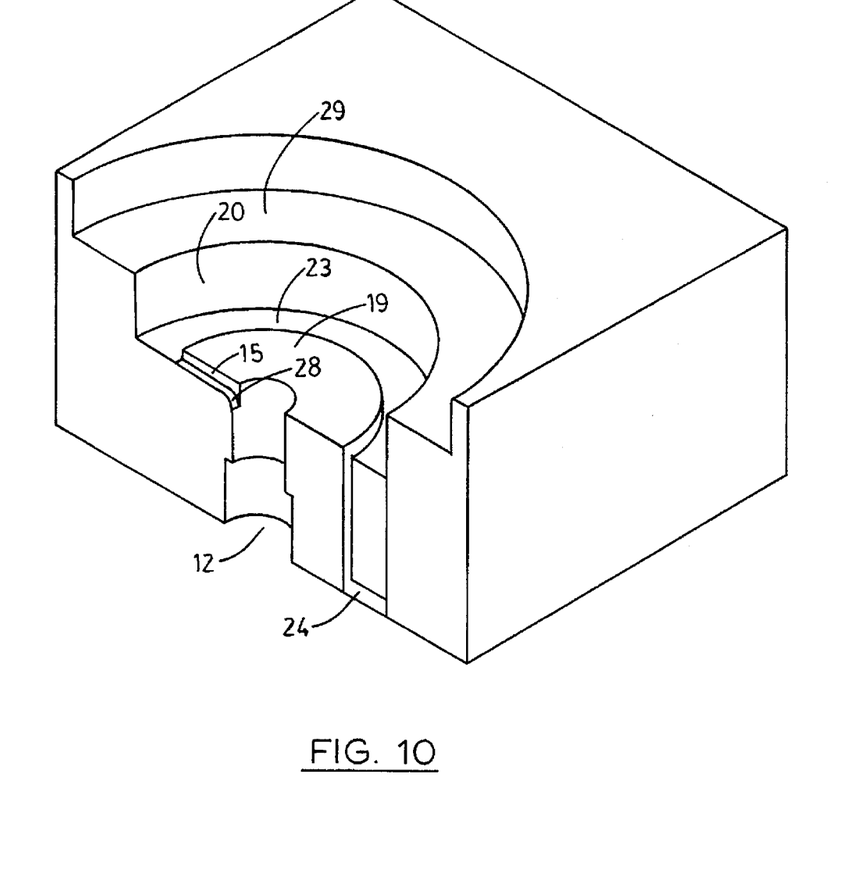
FIG. 10 is a greatly enlarged perspective cut-away detail view of the interior of the alternative embodiment of FIG. 9 showing the internal cavity without the membrane in the vicinity of the exit opening. In this embodiment there is no vertical slot.
Figure 11:
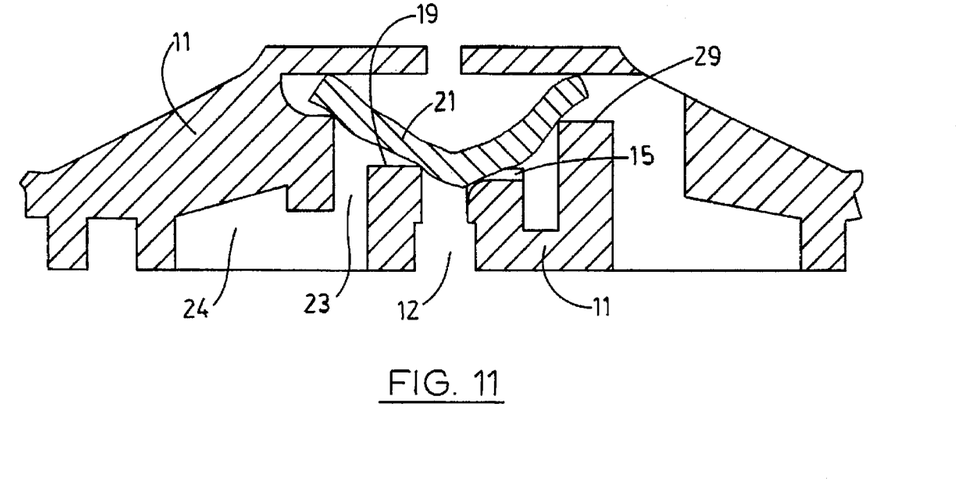
FIG. 11 is the enlarged cross-sectional side view of FIG. 9 showing the flexible membrane in the alternative embodiment of the present invention bending as pressure is applied to it.
Figure 12:
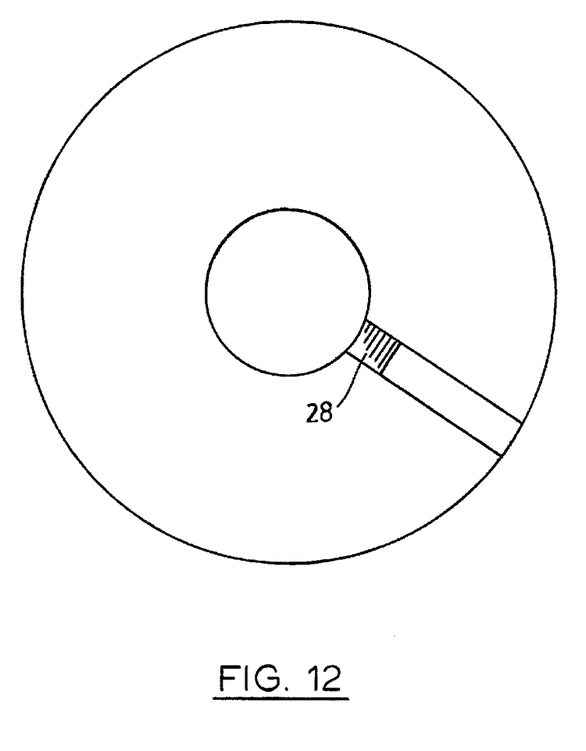
FIG. 12 is a top plan view of the exit opening in the bottom surface of the internal cavity of the alternative embodiment of the drip irrigation emitter shown in FIGS. 9–11.

An alternative embodiment is shown in FIGS. 9, 10 and 11. In this embodiment, slot 17 is omitted, and the inside edge 28 of groove 15 is rounded downward into opening 12 resulting in a gap above edge 28. This tapered inside edge 28 of groove 15 allows the emitter to operate in the same manner as described above without using slot 17. The alternative embodiment does not close off until a very high pressure of at least ninety (90) psi is reached. This is achieved because it takes a very high fluid pressure to press the membrane 21 firmly against the gap formed by the downwardly sloping edge 28 of groove 15. The deeper and more pronounced the slope of edge 28, the higher the pressure required to shut off the emitter.

DESCRIPTION OF THE PREFERRED EMBODIMENTS

In the preferred embodiment, the emitter of the present invention is made of sturdy rigid material, such as plastic. The emitter is small enough to fit inside an irrigation line having a diameter of one-half inch (½") or smaller, but can be of a larger size if desired. A small sized emitter is preferred because it provides a wide range of applications in smaller environments, while also performing exactly like a large emitter in larger environments. The cavity bottom and the membrane of the preferred small version of the emitter each have a correspondingly small surface area. Because of its small size, it is important that the membrane be made of a relatively soft material having a shore hardness of between 40 and 50 in order to allow it to bend more readily into the cavity under pressure from fluid in the line. Stiffer membranes should only be used in larger versions of the invention where the surface and cavity to be covered are larger, and more membrane surface area is available for the fluid to put pressure on.

In the preferred embodiment, slot 17 is provided in the exit hole 12. The corner 28 of the groove 15 leading down to the slot should preferably be rounded downward into the exit hole, although this is not required. The slot facilitates a trickle of fluid flow at very high pressures by defining a gap between the end of the groove 15 and the exit opening 12.

The preferred embodiment provides a cavity 20 having a distance of approximately one millimeter (1 mm) between surface 19 and platform 29 suspending the flexible membrane. This distance provides a sufficient gap to allow dirt and debris to be flushed out of the emitter at very low pressure thereby avoiding clogging. A soft membrane is required in the small versions of the invention in order to be sufficiently flexible to readily close this gap and make contact with surface 19.

In the alternative embodiment shown in FIGS. 9 and 10, vertical slot 17 is omitted. Instead, the edge of groove 15 inside opening 12 is tapered downward 28 until it is flush with the inside of opening 12 (see FIG. 10). Membrane 21 presses against surface 19 and groove 15 in the same way as the preferred embodiment. The tapered inside edge 28 of groove 15 acts in the same way as slot 17 of the preferred embodiment, delaying shut off of the emitter until a very high pressure is reached—enough to push the membrane firmly against edge 28 of groove 15. If the corner between the groove 15 and hole 12 is at or near a ninety degree (90°) angle, the membrane will be pressed against it more readily cutting of fluid flow earlier and at lower pressure.

In another alternative embodiment, a larger emitter may be provided having a larger surface 19, a wider platform 29 and a stiffer membrane 21. A cavity 20 height of only 1 millimeter (1 mm) between surface 19 and platform 29 still provides a sufficient cavity for flushing out debris. Because of the larger areas of membrane 21 and surface 19 coupled with a cavity of approximately 1 mm in height, a less flexible membrane will still close the gap between platform 29 and surface 19.

Figure 13:
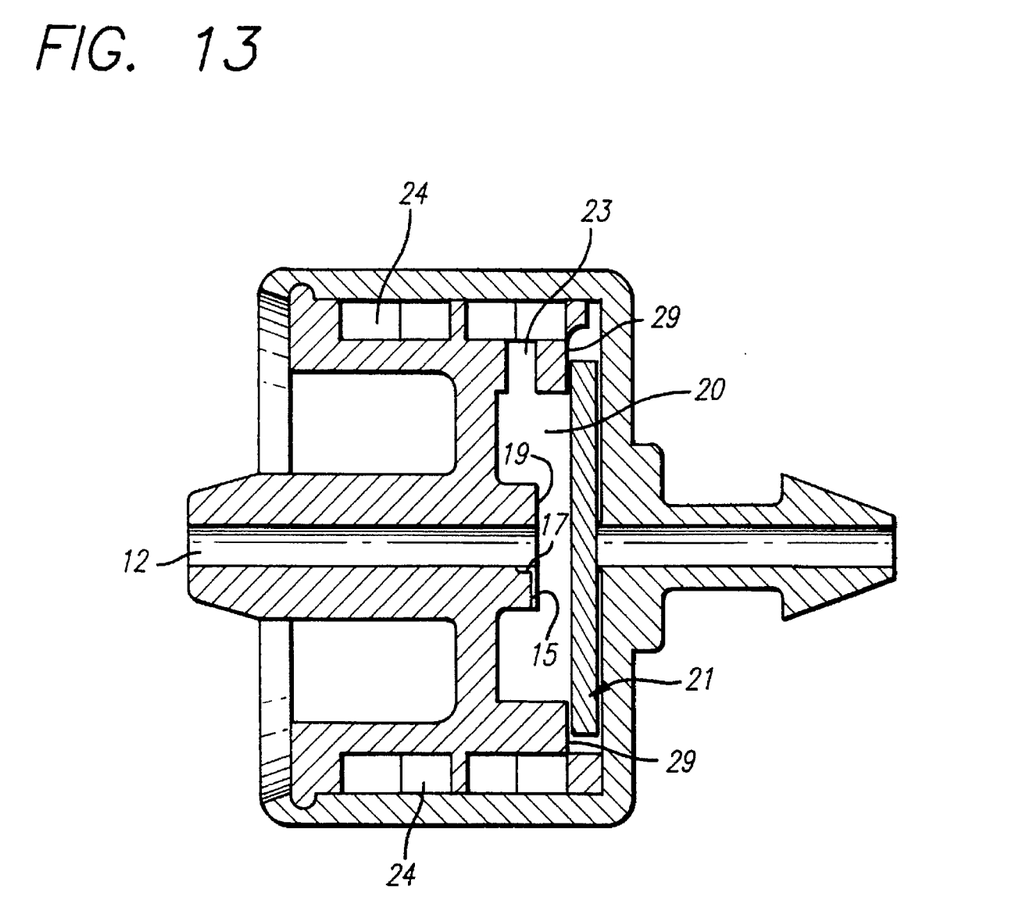
FIG. 13 is a cut away side view of an alternative embodiment of the invention that may be attached to the outside of a conduit line.

In yet another alternative embodiment, the emitter may be designed to attach to the outside of a conduit line, instead of inserted inside the line. Such an embodiment involves a self-contained unit that has an outward appearance of a shell as opposed to a cylinder. The relationships of the fluid flow to membrane 21, cavity 20, platform 29, surface 19, groove 15 and opening 12 within housing 11 are the same as with the insertable emitter; however, the labyrinths and turbulent flow paths are located inside the shell of the emitter.

Changes and adjustments may be made in the size and/or shape of the laybrinths 24, cavity 20, groove 15, slot 17, opening 12, membrane 21, surface 19 and/or platform 29 in order to obtain a desired flow rate over a desired range of fluid pressures for a conduit line having a desired diameter.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A drip irrigation emitter comprising a housing for attachment to a conduit line, said housing including a flat interior surface at the bottom of a cavity, a flat flexible membrane bendably suspended at its perimeter on a platform above said cavity the top side of which is exposed to the pressure of fluid flowing inside said conduit line, a central opening in said surface perpendicular thereto and leading to the exterior, a groove on said surface extending radially outward from said opening to an edge of said surface, a second opening at the edge of said surface leading through a plurality of pressure-reducing labyrinths back to the flow of fluid inside said conduit line, and a slot in said central opening where it connects to said groove, whereby as pressurized fluid is introduced from said conduit line into said emitter, said membrane presses into said cavity and against said surface, groove, slot and central opening thereby restricting the flow from the emitter to a constant rate across a range of very low to very high pressure.

2. The emitter described in claim 1 wherein said slot is perpendicular to said groove, and the corner between said slot and said groove is rounded.

3. The emitter described in claim 2 wherein said membrane is made of a relatively soft bendable material.

4. The emitter described in claim 3 wherein said emitter is small enough to fit inside a conduit line having a diameter of no more than one half inch.

5. The emitter described in claim 2 wherein said emitter is inserted inside a conduit line.

6. The emitter described in claim 3 wherein said emitter is attached to the outside of a conduit line.

7. The emitter described in claim 3 wherein a gap is provided between said surface and said platform in order to allow the flushing of debris from the inside of the emitter at low initial fluid pressure.

8. The emitter described in claim 7 wherein the distance between said platform and said surface is approximately one millimeter.

9. The emitter described in claim 3 wherein the outside diameter of said membrane is no more than eight millimeters (8 mm).

10. The emitter described in claim 3 wherein said housing has a low profile height of no more than three and one-half millimeters (3.5 mm).

11. A drip irrigation emitter comprising a housing for attachment to a conduit line, said housing including a flat interior surface at the bottom of a cavity, a flat flexible membrane bendably suspended at its perimeter on a platform above said cavity the top side of which is exposed to the pressure of fluid flowing inside said conduit line, a central opening in said surface perpendicular thereto and leading to the exterior, a groove on said surface extending radially outward from said opening to an edge of said surface said groove having a rounded corner where it meets said opening, a second opening at the edge of said surface leading through a plurality of pressure-reducing labyrinths back to the flow of fluid inside said conduit line, whereby as pressurized fluid is introduced from said conduit line into said emitter, said membrane presses into said cavity and against said surface, groove, rounded corner and central opening thereby restricting the flow from the emitter to a constant rate across a range of very low to very high pressure.

12. The emitter described in claim 11 wherein said membrane is made of a relatively soft bendable material.

13. The emitter described in claim 11 wherein said emitter is inserted inside a conduit line.

14. The emitter described in claim 13 wherein said emitter is small enough to fit inside a conduit line having a diameter of no more than one half inch.

15. The emitter described in claim 11 wherein said emitter is attached to the outside of a conduit line.

16. The emitter described in claim 11 wherein a gap is provided between said surface and said platform in order to allow the flushing of debris from the inside of the emitter at low fluid pressure.

17. The emitter described in claim 16 wherein the distance between said platform and said surface is approximately one millimeter.

* * * * *